Figures 1, 2, 3:
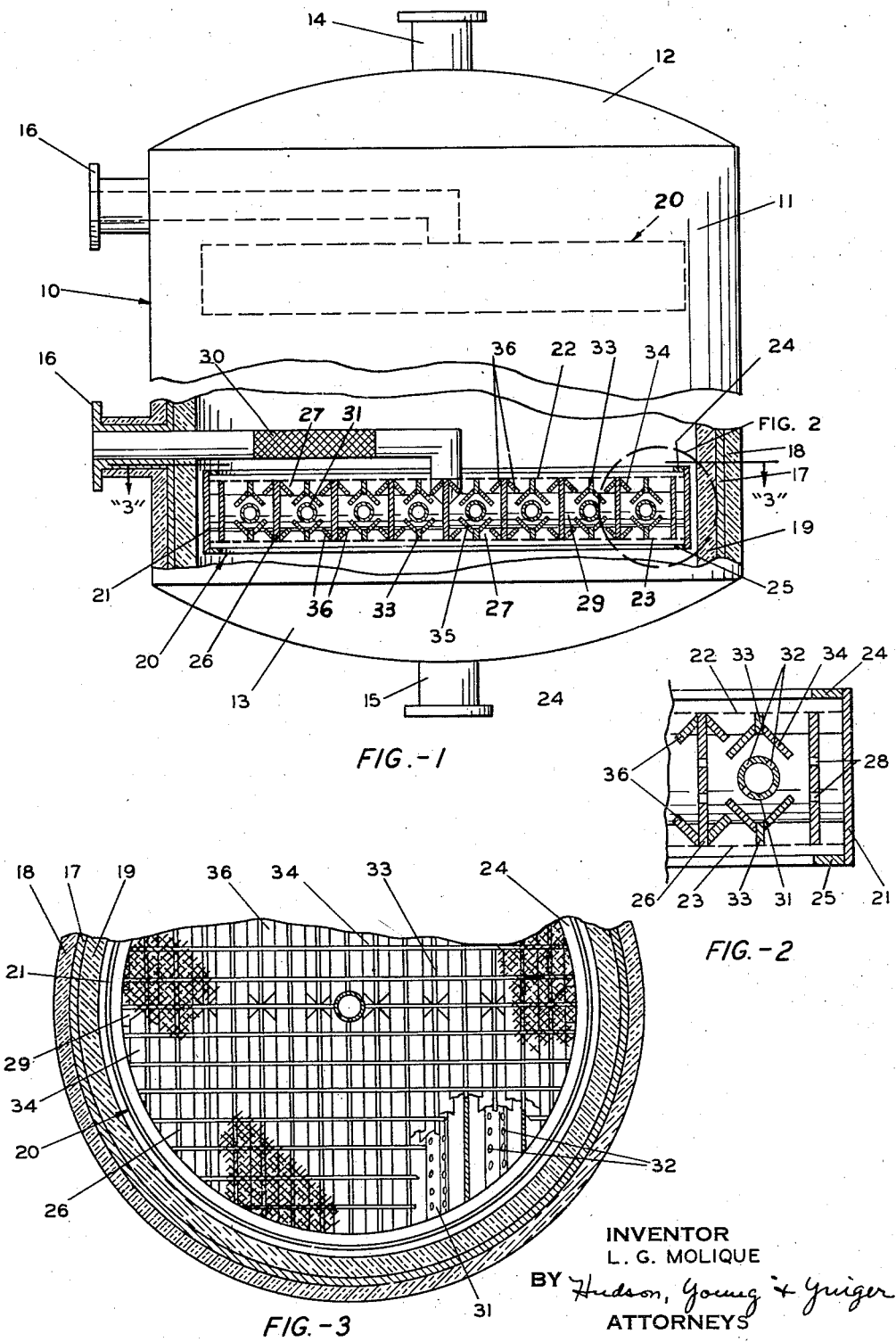

Feb. 25, 1947.  L. G. MOLIQUE  2,416,491
CATALYST CHAMBER APPARATUS
Filed Nov. 12, 1943

INVENTOR
L. G. MOLIQUE
BY Hudson, Young & Yuiger
ATTORNEYS

Patented Feb. 25, 1947

UNITED STATES PATENT OFFICE 2,416,491

CATALYST CHAMBER APPARATUS

Lawrence G. Molique, Bartlesville, Okla., assignor to Phillips Petroleum Company, a corporation of Delaware Application November 12, 1943, Serial No. 510,066

5 Claims. (Cl. 23—288)

This invention relates to catalyst chambers of the class generally employed in carrying out hydrocarbon conversions in the presence of substantially fixed masses of solid catalytic material. Among its more specific aspects, the present invention pertains to improved apparatus for properly distributing fluid into a chamber of the character indicated in the course of the catalytic conversion of hydrocarbons therein and/or in the course of reactivating the catalytic material when the same becomes contaminated with carbonaceous material as a result of the conversion of hydrocarbons, to thereby obtain effective heat control within the chamber.

Catalyst chambers are of particular utility in the catalytic conversion of hydrocarbon oils, especially in the cracking of said oils, to facilitate direct heat transfer and temperature control within the catalyst mass. Thus, in the catalytic cracking of hydrocarbon oil it is usually desirable to supply heat to vapors of said oil undergoing treatment during the conversion period in the event that the conversion is endothermic, and to remove heat developed in the course of the exothermic reactivation of the catalyst by combustion of the carbon deposited thereon. There are instances wherein the hydrocarbon conversion may be exothermic in character and in such cases, care must be taken to remove undesirable heat by supplying suitable heat absorbing fluids to the vapors of the hydrocarbons being treated.

The preferred and generally recognized method of controlling the temperature within solid catalyst masses of relatively low thermal conductivity contemplates the direct injection of suitable fluids into the catalyst chamber to thereby either heat or cool the catalyst mass, depending upon whether the reaction taking place within the chamber is endothermic or exothermic. In carrying out this procedure, it is essential that suitable fluid injection and distribution apparatus be provided in order that the temperature control medium employed may absorb or transfer heat to the vapors or gases flowing through the chamber. This has been accomplished heretofore by arranging the catalyst material in a series of sections with intermediate free spaces for the introduction of fluid diluents and/or reaction mixtures. The fluid material so introduced into said intermediate free spaces has in the past been injected directly into the path of the material flowing through the catalyst chamber.

It has been discovered that when the fluid temperature control medium is introduced directly into the path of the regenerating fluid in the course of the catalyst regeneration portion of the cycle, the same tends to be disposed directly upon particles of catalyst material, thereby retarding the reactivation of the same. Similarly, when the temperature control fluid medium is introduced directly into the path of the vapors undergoing reaction in the conversion portion of the cycle, they likewise tend to be disposed on the surface of the catalyst material thereby lowering the activity thereof. Additionally, whether during the conversion or reactivation portion of a complete cycle, the transfer of heat between the heat control medium and the fluid material flowing through the catalyst chamber cannot be substantially evenly accomplished over a given cross-section area of the chamber by the employment of the usual types of distribution equipment.

The present invention obviates or materially reduces the difficulties referred to above and provides an arrangement of apparatus capable of effectively distributing a heat control fluid medium into the catalyst chamber. The apparatus of this invention also serves to separate one bed or layer of solid catalyst material from an adjacent bed of such material. As will be apparent to persons skilled in the art from an examination of the detailed description appearing farther along, the heat control fluid medium is distributed evenly throughout substantially the entire cross-section area of the interior of the chamber and efficient heat transfer between the fluid flowing through the catalyst chamber and the heat control fluid medium distributed into the chamber is readily obtained. The heat control fluid medium is transmitted into a header or manifold disposed across the interior of the chamber by means of a conduit communicating with the exterior of the chamber. The fluid so admitted into the header is conveyed under pressure into a plurality of branch lines communicating with the header and is discharged or jetted from the branch lines through a plurality of ducts extending through the wall of each branch line. At least one baffle is so constructed and arranged with respect to each branch line that fluid jetted through the ducts is impinged thereagainst. In the event that the apparatus of the present invention is being employed in the course of an endothermic hydrocarbon conversion, the fluid impinging against the baffles is generally of higher temperature than that of the vapors undergoing conversion and therefore transfers heat to the baffles which in turn transfers part of said heat to the vapors coming in contact therewith. In the course of an exothermic catalyst regeneration procedure, it is desirable to lower the temperature of the regenerating fluid passing through the catalyst material. Accordingly, the fluid heat control medium used under these circumstances is at a lower temperature than that of the regenerating fluid and upon being discharged through the branch line ducts and impinging against the baffle, said fluid absorbs at least part of the heat transferred to the baffles by the hotter regenerating fluid. Furthermore, after being impinged against the baffles the fluid heat control medium, whether employed in an endothermic or an exothermic procedure, is thoroughly mixed with the fluid passing through the chamber to further control the temperature within the chamber.

It is the primary object of the present invention to provide apparatus for effectively distributing a fluid heat control medium into a catalyst chamber whereby the temperature of a reaction taking place within the chamber may be effectively controlled.

Another object of this invention is to provide apparatus of the character described that is adapted to be employed with a catalyst chamber to increase the efficiency of the operation taking place within the chamber.

This invention has for a further object the provision of a fluid heat control distribution apparatus of the type indicated above which is relatively simple in design, durable in construction, efficient in operation, and comparatively inexpensive in original and maintenance costs.

These, as well as other objects and advantages, will be readily comprehended by persons skilled in the art by reference to the following detailed description and annexed drawings which respectively describe and illustrate a preferred embodiment of the invention and wherein, Figure 1 is an elevation view of the invention, partly in cross-section, Figure 2 is an enlargement of a portion of the apparatus illustrated in Figure 1, and Figure 3 is a horizontal cross section view taken along line 3—3 in Figure 1.

Referring to the drawing, and more particularly to Figure 1 thereof, I have denoted a catalyst chamber generally indicated by reference numeral 10 and including a vertical cylindrical sidewall 11, a top wall 12 and a bottom wall 13. When the catalyst chamber is being employed to carry out a hydrocarbon conversion reaction, a stream of hydrocarbon feed stock is preferably introduced into chamber 10 through an inlet 14 and the converted products are discharged from chamber 10 by way of an outlet 15. Similarly, when contaminated solid catalyst material within the catalyst chamber is being treated to burn off carbonaceous material deposited thereon in the course of a preceding hydrocarbon conversion procedure, regenerating fluid is preferably introduced into chamber 10 through inlet 14 and spent regenerating fluid is withdrawn from chamber 10 by way of outlet 15. It will hence be noted that, if desired, the same inlet and outlet in the catalyst chamber may be employed in either the conversion or the regenerating portion of a complete cycle. A plurality of conduits 16 for conveying a heat control fluid medium into the chamber extends through sidewall 11. The walls of chamber 10 are fabricated from plate or sheet metal 17 of requisite thickness and composition. The outer surface of the chamber is provided with a covering of insulation 18 of the asbestos type, whereas the inner surface carries a suitable sheath of refractory insulation 19, such as the well-known insulag or insulcrete.

A plurality of cylindrical spaced containers generally represented by numeral 20, are disposed substantially coaxially within chamber 10 and spaced from the inner surface of insulation 19 to permit relative movement between each container and the interior of the chamber. Containers 20 divides the interior of chamber 10 into a plurality of compartments and each container supports a bed of solid catalyst material (not shown) thereabove. Containers 20 each includes a cylindrical sidewall 21, a perforate top wall 22 and a perforate bottom wall 23. Said walls 22 and 23 are perforated in a manner to permit the flow of fluid material therethrough, while preventing the passage of solid catalyst material therethrough. An upper ring 24 and a lower ring 25 prevent the passage of solid catalyst material between the peripheral edge of top and bottom walls 22 and 23, respectively, and the inner surface of the sidewall of container 20. A plurality of substantially parallel partitions 26 is disposed across the interior of container 20 to thereby divide the same into a plurality of vertical compartments 27. Each partition 26 is provided with a plurality of ports 28 extending therethrough to allow the flow of fluids from any one compartment to the next adjoining compartment.

A header or manifold 29 extends diametrically across the interior of container 10 and at substantially right angles to partitions 26; the extreme ends of header 29 are closed. Conduit 16 communicates centrally with header 29. It will be noted that conduit 16 includes a flexible section 30 for permitting vertical movement of container 10 and contents thereof, due to expansion or contraction occasioned by temperature changes in the chamber. A branch line 31 is disposed on each side of header 29 in each compartment. Each branch line 31 is spaced from top wall 22, bottom wall 23 and the partitions defining each corresponding compartment. One end of each branch line communicates with header 29, while the other end of each branch line is closed. A plurality of ducts 32 extends through the wall of each branch line. Said ducts 32 are spaced both axially and circumferentially in each branch line 31.

Bars 33 are positioned directly above and below the axis of branch lines 31 and extend across container 20 parallel to partitions 26. Each upper bar 33 supports an inverted V-shaped baffle 34 that is spaced from and is substantially coextensive with the corresponding branch line. Each lower bar 33 carries a similarly arranged V-shaped baffle 35. It will be observed that a baffle plate 36 is connected on each side and at each end of partitions 26. By virtue of the arrangement of the partitions and baffles 34, 35 and 36, fluid discharged from branch lines 31 through ducts 32 does not come directly into contact with the fluid transmitted downwardly through the chamber; but, instead, impinges upon the baffles and follows a relatively long path before it is admixed with the chamber fluid.

For the purpose of outlining the mode of the operation of my invention, let us first assume that the same is employed to carry out an endothermic hydrocarbon conversion process. With the equipment assembled, as illustrated, and with a bed of suitable solid catalyst material supported on each container 20, the hydrocarbon feed stock to be treated is introduced into chamber 10 by way of inlet 14. The feed stock is heated to the temperature range necessary to effect partial conversion on passing through the top bed of catalyst material. Since the process is endothermic in character, it is essential that a suitable fluid heating medium be introduced into the chamber to supply necessary heat to the hydrocarbons as they pass downwardly through successive catalyst beds. This fluid heating medium is introduced under pressure through conduit 16 into header 29 and thence into branch lines 31, whence it is discharged by way of ducts 32. The fluid discharged through the ducts impinges against the baffles and imparts heat thereto, this heat being transferred to the hydrocarbon fluid when the same contacts the baffles. It will be apparent that as the hydrocarbon fluid passes through container 20, it intermingles with dispersed fluid medium discharged through ducts 32. It will be observed that the temperature of the fluid medium discharged through ducts 32 that are positioned nearer header 29 will be of a somewhat higher temperature than the fluid discharged through the ducts that are positioned at points distant from the header. By virtue of the baffle arrangement herein illustrated and described, even heat distribution over substantially the entire cross section area of the chamber may be properly attained.

When the present invention is employed in carrying out an exothermic reaction, such as the regeneration of solid catalyst that has been contaminated by carbon deposited thereon, it operates in substantially the manner indicated above. The main difference resides in the fact that the fluid introduced through conduit 16 and the distributing arrangement will necessarily be at a much lower temperature than hot regenerative fluids, since it is the function of the fluid medium to remove heat and thereby control the temperature within chamber 10 to attain proper heat control and prevent injury to the catalyst material.

From the foregoing, it is believed that the construction, operation, and advantages of my present invention will be readily comprehended by persons skilled in the art. It is to be clearly understood, however, that various changes in the apparatus set forth above may be made without departing from the scope of the invention, it being intended that all matter contained in the description or shown in the drawing shall be interpreted as illustrative only and not in a limiting sense.

I claim:

1. In apparatus for use with a closed tubular catalyst chamber, the combination comprising a tubular closed container adapted to be substantially coaxially positioned within the chamber and including perforate end walls, a plurality of substantially parallel partitions disposed lengthwise across the container and dividing the interior thereof into a series of compartments, a fluid header positioned within the container and at substantially right angles to the partitions, a branch line in each compartment substantially parallel to the partitions, said branch lines communicating with the header, a plurality of ducts extending through the wall of each branch line, a conduit adapted to transmit fluid into the header from the exterior of the chamber, fluid so transmitted into the header passing into the branch lines and being discharged therefrom through the corresponding ducts, and at least one baffle within each compartment and constructed and arranged with respect to the corresponding branch line so that fluid discharged through corresponding ducts impinges thereagainst.

2. In apparatus for use with a closed tubular catalyst chamber, the combination comprising a tubular closed container adapted to be substantially coaxially positioned within the chamber and including perforate end walls, a plurality of substantially parallel partitions disposed lengthwise across the container and dividing the interior thereof into a series of compartments, a fluid header positioned within the container and at substantially right angles to the partitions, a branch line in each compartment substantially parallel to the partitions, said branch lines communicating with the header, a plurality of ducts extending through the wall of each branch line, a conduit adapted to transmit fluid into the header from the exterior of the chamber, fluid so transmitted into the header passing into the branch lines and being discharged therefrom through the corresponding ducts, and baffle means in each compartment comprising a baffle disposed between one end wall of the container and each branch line and a baffle disposed between the other end wall of the container and each branch line, said baffle means being substantially coextensive with corresponding branch lines and being constructed and arranged with respect thereto so that fluid discharged through corresponding ducts is impinged thereagainst.

3. The combination in accordance with claim 2 wherein each end of the header and one end of each branch line are closed.

4. The combination in accordance with claim 2 wherein openings are provided through the partitions permitting the passage of fluid from each compartment to the next adjoining compartment.

5. In apparatus for use with a closed substantially vertical and cylindrical catalyst chamber, the combination comprising a substantially cylindrical closed container adapted to be positioned substantially coaxially within the chamber intermediate the ends thereof, said container including perforate top and bottom walls, a plurality of substantially parallel partitions between the top and bottom walls of the container dividing the interior thereof into a series of substantially vertical compartments, at least one aperture in each partition establishing fluid communication between any one compartment and the next adjoining compartment, a fluid header positioned substantially centrally and diametrically across the interior of the container, said header being closed at each end and extending through each partition at substantially right angles thereto, a separate branch line on each side of the header in each compartment and spaced from and substantially parallel to the partitions, one end of each branch line communicating with the header and the other end thereof being closed, a plurality of ducts extending through the wall of each branch line, a conduit adapted to transmit fluid from the exterior of the chamber into the header, fluid so transmitted into the header passing into the branch lines and being discharged therefrom through the ducts, and baffle means in each compartment comprising a baffle disposed between the top wall of the container and each branch line and a baffle disposed between the bottom wall of the container and each branch line, said baffle means being substantially imperforate and coextensive with corresponding branch lines and being constructed and arranged so that fluid discharged through corresponding ducts is impinged thereagainst.

LAWRENCE G. MOLIQUE.

REFERENCES CITED

The following references are of record in the file of this patent:

UNITED STATES PATENTS

| Number | Name | Date |
|---|---|---|
| 1,987,903 | Houdry | Jan. 15, 1935 |
| 2,330,767 | Welty | Sept. 28, 1943 |
| 2,104,858 | Ferguson | Jan. 11, 1938 |
| 2,251,571 | Howard | Aug. 5, 1941 |